United States Patent [19]
Wiesner et al.

[11] Patent Number: 5,749,634
[45] Date of Patent: May 12, 1998

[54] ELASTIC MOUNTING FOR TRACK PIVOT PINS IN ENDLESS HINGED VEHICULAR CRAWLER DRIVE TRACKS

[75] Inventors: Hagen Heinz Wiesner, Solingen; Klaus Spies, Remscheid, both of Germany

[73] Assignee: Diehl Remscheid GmbH & Co., Germany

[21] Appl. No.: 624,644

[22] PCT Filed: Jan. 25, 1995

[86] PCT No.: PCT/EP95/00258

§ 371 Date: Apr. 11, 1996

§ 102(e) Date: Apr. 11, 1996

[87] PCT Pub. No.: WO95/21089

PCT Pub. Date: Aug. 10, 1995

[30] Foreign Application Priority Data

Feb. 1, 1994 [DE] Germany ............... 44 02 946.2

[51] Int. Cl.$^6$ ............................................. B62D 55/215
[52] U.S. Cl. ............................. 305/42; 305/202; 305/205
[58] Field of Search .............................. 305/42, 59, 202, 305/203, 204, 102, 103, 104, 105, 106, 11, 58 R, 58 PC

[56] References Cited

U.S. PATENT DOCUMENTS

| | | | |
|---|---|---|---|
| 1,496,298 | 6/1924 | Chapman | 305/204 X |
| 2,291,623 | 8/1942 | Hanson et al. | 305/42 X |
| 2,375,170 | 5/1945 | McNeil | 305/42 X |
| 2,391,907 | 1/1946 | Knox | |
| 2,396,848 | 3/1946 | Haushalter | 305/42 X |
| 2,939,747 | 6/1960 | Tucker, Sr. | 305/202 X |
| 3,362,759 | 1/1968 | Ley | 305/59 |
| 4,195,887 | 4/1980 | Ruddell | |
| 4,626,046 | 12/1986 | Collins, Jr. | 305/204 X |
| 4,892,365 | 1/1990 | Szakacs | |

FOREIGN PATENT DOCUMENTS

| | | | |
|---|---|---|---|
| 3621 736 A1 | 1/1987 | Germany | |
| 373202 | 5/1973 | U.S.S.R. | 305/58 R |
| 1071508 | 2/1984 | U.S.S.R. | 305/58 R |

*Primary Examiner*—Russell D. Stormer
*Attorney, Agent, or Firm*—Scully, Scott Murphy and Presser

[57] ABSTRACT

In hinge tracks with rubber mountings (5) in which rubber-lined tubular steel bushes mount track pivot pins (20), the pin ends are usually provided with screwthreaded projection portions so that the steel bushes (10) are motion-free braced relative to each other and relative to the track pivot pins (20) by means of nuts. In order to improve the useful life of the rubber mounting (5) and reduce maintenance, a rubber-lined spreadable bush (10) with at least one dividing gap (11) is proposed instead of the tubular bush. The internal width (25) of the bush (10) which is pressed into position is less than the diameter (27) of the track pivot pin (20). The inserted track pivot pin (20) expands the bush (10) which is pressed into the chain link member (1). In that case the track pivot pin (20) is braced in the bush (10) and is fixed in its longitudinal direction by frictional engagement and in the peripheral direction by frictional engagement and/or positively locking engagement. The screw for bracing the bushes (10) are eliminated and an increase in the rubber mounting surface is achieved by virtue of using the screwthread space of the screwthread arrangement. That affords an increased service life for the rubber mounting in a maintenance-free design configuration.

16 Claims, 4 Drawing Sheets

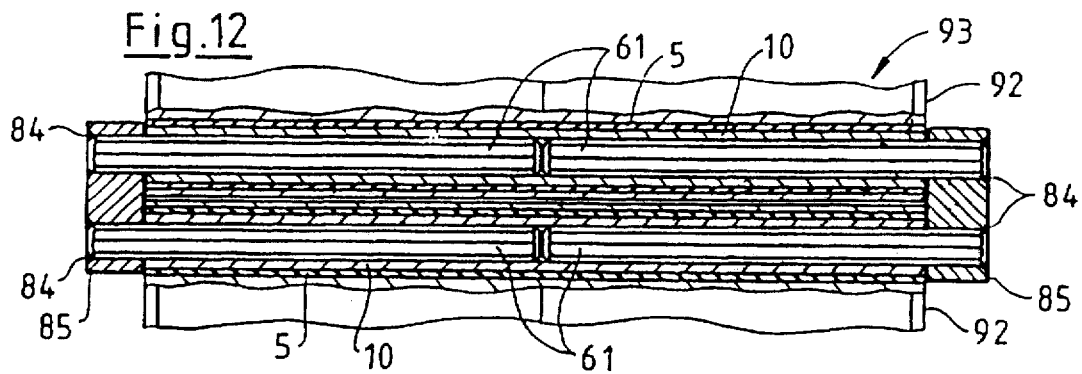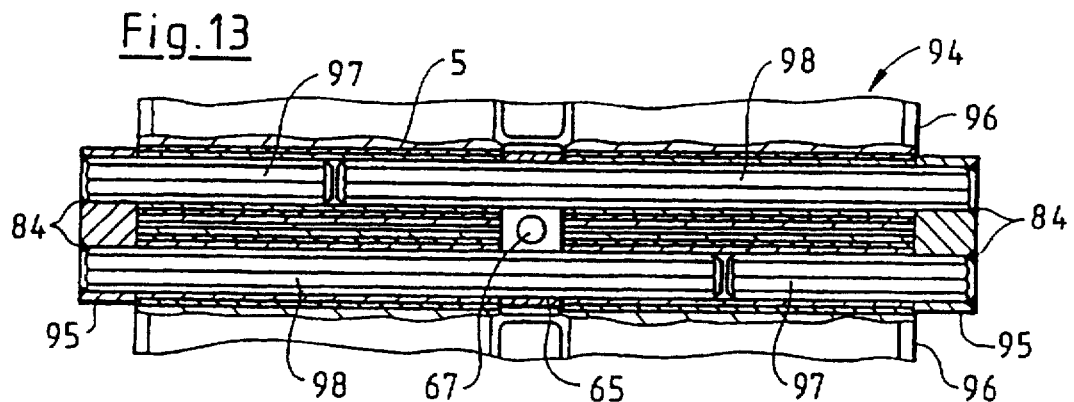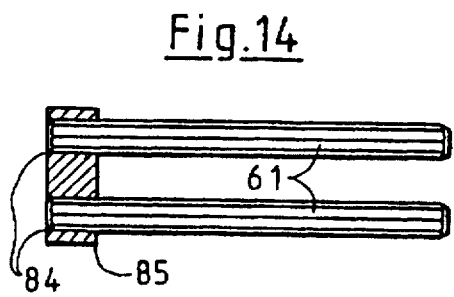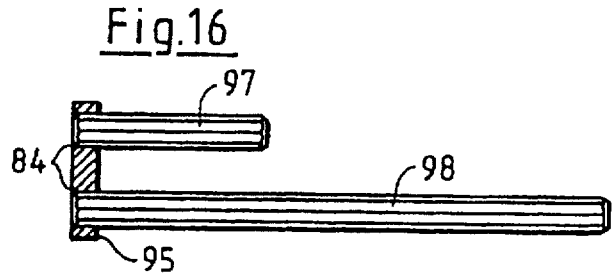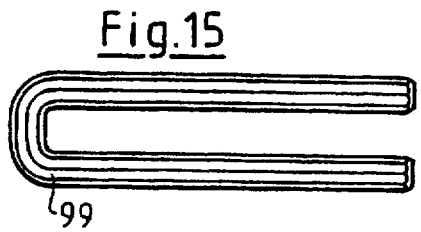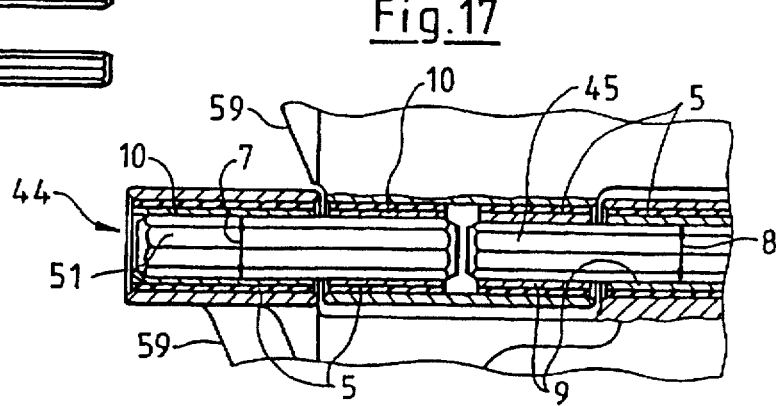

5,749,634

ELASTIC MOUNTING FOR TRACK PIVOT PINS IN ENDLESS HINGED VEHICULAR CRAWLER DRIVE TRACKS

BACKGROUND OF THE INVENTION

1. Field of the Invention

The invention relates to an elastic mounting for track pivot pins in Caterpillar tracks, which are endless hinged vehicular crawler drive tracks, including a prestressed rubber mounting arranged in a bore formed in a track link member and being seated on a bushing, and in which the track pivot pin carries the bushing.

2. Discussion of the Prior Art

As is known, hinged tracks with rubber mountings are used in track-laying vehicles, in accordance with U.S. Pat. No. 4,195,887. Track pivot pins are inserted in rubber-lined steel bushes. The track pivot pin and the steel bush are of a hexagonal or octagonal profile or another shape in cross-section in order to provide a positively locking connection between the bush and the track pivot pin in the peripheral direction and in order to guarantee the correct position of assembly of the track members relative to each other.

Screwthreaded projection portions can be provided at the ends of the track pivot pins so that the steel bushes are motion-free braced relative to each other by means of nuts. That motion-free bracing effect is necessary so that the pin or the bushes are not deflected in operation of the vehicle.

In the case of connector tracks with rubber-lined steel bushes and track pivot pins which are inserted therein, the connecting members are also motion-free braced by way of steel bushes. That prevents the connecting members and the track pivot pins from being deflected.

In the case of a hinge track for vehicles, in accordance with DE-AS No 1 085 433, it is known for track pivot pins to be mounted in rubber-lined metal bushes. The track pivot pins may be of a circular cross-section or they may be in the form of profiled hexagonal pins or in the form of grooved track pivot pins. The bushes of the rubber block sleeves are of an integral configuration, that is to say they do not have any division gap. The rubber blocks are connected to the bushes by vulcanisation. The bushes are flanged over at the ends of the track pivot pins, to prevent axial displacement of the track pivot pins in their axial direction. A fundamental disadvantage in this respect is that the track pivot pins are not braced in the bushes either in the radial direction or in the axial direction, that is to say the track pivot pins are not prestressed relative to the bushes. As a result, the arrangement suffers from a high level of wear due to deflection of the track pivot pins or bushes. That kind of mounting for track pivot pins has not proven successful.

SUMMARY OF THE INVENTION

The rubber mountings of the rubber-mounted hinged tracks which are used nowadays are particularly susceptible to wear.

Therefore the object of the invention is to improve the useful life of the rubber mountings.

The invention attains that object in accordance with the foregoing concept in that the bushing incorporates at least one dividing gap in the longitudinal direction, and the internal width of the bushing, which is arranged in the bore formed in the track link member within the rubber mounting, is smaller than the diameter of the track pivot pin.

In accordance with the invention the track pivot pin enjoys the required firm fit by virtue of the prestressed rubber mounting by way of a bush with at least one dividing gap in the longitudinal direction thereof. The bush is rubber-lined with the known rubber rings by vulcanisation and then pressed into the bores in the track link member. The rubber rings thereby acquire the major part of their prestressing force. In the pressed-in condition, the slot or slots is or are closed by the pressure of the braced rubber rings. The diameter of the track pivot pin is oversize relative to the internal width of the bush which is pressed into place. By virtue of the track pivot pin being pushed in, the rubber mounting therefore acquires its definitive, desired prestressing force. That prestressing force acts as a reaction force on the track pivot pin and braces it in its fit in the bush.

On the other hand the specific pressure in relation to surface area of the rubber rings at the inside wall of the bores in the track link member is so great that pivotal movements of the track pivot pin in the rubber mounting are absorbed and cushioned without the rubber mounting slipping through in the bore in the track link member.

The bracing of the track pivot pin by way of the rubber mounting is of such a magnitude that on the one hand the track pivot pin can still be inserted, that is to say it can be fitted and removed. On the other hand, the arrangement guarantees that the track pivot pin is a firm fit in the bushes so that those components do not suffer from deflection in operation of the vehicle.

Lateral displacement of one-part or multi-part track pivot pins in the bushes does not occur due to the contact pressure which is exerted by the bushes. In accordance with the invention, when using one-part or multi-part track pin members in hinge tracks and when using one-part or multi-part track pin members in connector tracks, form-locking or positively locking means are provided as additional means for preventing lateral displacement. Such positively locking means engage in the form of beads or tongues into corresponding recesses or against surfaces of the track pivot pins. The beads or tongues are parts of the bushes.

In the case of multi-part track pivot pins in connector tracks having two or more connecting elements, the track pivot pins are secured by connectors which are made in one piece and which are to be braced on the track pivot pin.

Depending on the respective configuration of the track pivot pins and the connectors, there is a positive-locking and/or force-locking connection between the track pivot pins and the connectors.

Depending on the respective cross-sectional shape of a track pivot pin, the bushes are of different profiles. Besides the known octagonal and hexagonal profiles, it is possible to use bushes with polygonal profiles and with the dividing gaps in different positions.

The bushes are therefore constructed with an equal wall thickness, which permits inexpensive manufacture by virtue of deformation of sheet metal or flat profile portions. The use of a round profile in respect of the bush presupposes that the bracing in respect of the track pivot pin is such that the track pivot pin does not slip through in the bush when passing through the angles of rotational movement of the rubber mounting.

Besides the known construction for the track pivot pin in one piece, it may comprise a plurality of individual pivot pin portions of the same or different lengths, for the purposes of reducing cost and to make assembly easier.

The invention provides, in the case of rubber-mounted hinge tracks, a substantial increase in the size of the load-bearing rubber mounting surface, by virtue of using the structural space which hitherto was used for the nuts at the track pivot pin ends. That affords the increased useful life for the rubber mounting.

In the case of connector tracks in which rubber-coated track pivot pins are mounted in bores in the track link members and connecting elements provide the connection for the individual track members to each other, the outwardly disposed connecting elements are usually in one piece and the inwardly disposed connecting elements are in two pieces and are provided with a clamping screw. By clamping of the connecting elements on to the track pivot pins of adjacent track link members, that arrangement provides a motion-free connection and the movement of adjacent track link members is afforded exclusively by the rubber mountings of the track pivot pins.

In order to reduce the number of parts of a track link member, to cut down costs, to increase operational reliability, to reduce maintenance expenditure and to simplify handling, instead of the rubber-coated track pivot pin, proposed is the rubber-lined bush in accordance with the invention which in the longitudinal direction has at least one dividing gap and into which the track pivot pin is inserted. As the internal width of the bush in the unstressed condition is smaller than the diameter of the track pivot pin, the track pivot pin when inserted spreads open the bush which is pressed in the track link member. In that case, the track pivot pin is braced in the bush and fixed in its longitudinal direction by frictional engagement and in the peripheral direction by frictional engagement and/or positively locking engagement. This fixed connection of two track pivot pins into two adjacent track link members makes it unnecessary to provide the outwardly disposed, screwed connecting elements.

In the case of track link members with more than two connecting elements, the inwardly disposed connecting elements can be of a one-part configuration, thereby substantially increasing reliability. In that way it is possible to produce track link members with only two connecting elements, without screw means. In the case of more than two connecting elements, screw means are required only on the inwardly disposed connecting elements.

In accordance with the invention, there is no need for maintenance operations at the mounting of the track pivot pin of hinge tracks as there is no -need for continuously retightening the screw means for bracing the bushes. That also applies in regard to connector tracks up to a certain track width without screw means. Furthermore the number of components of the track is reduced by eliminating for example screws and nuts and loose connecting elements. That assembly therefore involves freedom from maintenance.

Furthermore, the invention substantially enhances the reliability and security of connector tracks with more than two connecting elements by virtue of the fact that all connecting elements can be closed, that is to say they can be made in one portion or in one piece.

Removal of the track pivot pins and separation of the track link members is also possible without difficulty after use over a long period of time as the track pivot pin can be broken loose and displaced in the elastically mounted and divided or slotted bush, under the effect of corrosion and dirt which has penetrated into the assembly, more easily than in an undivided bush which rigidly embraces the track pivot pin.

Also, reliable separation of the hinge track link members is possible after removal of the track pivot pin. For, the bushes according to the invention are reduced in terms of their length relative to closed bushes so that axial displacements of the bushes, which occur due to possible settlement or consolidation of the rubber mounting, do not result in any impeding effect or locking effect, upon dismantling of the arrangement. Settlement or consolidation of the rubber mounting occurs due to a long operating life and a high level of loading in travel operation of the hinge track.

As the bushes in the case of hinge tracks are not braced by way of screw means, the wall thickness is considerably reduced in comparison with the previous design configuration. A suitable material is a conventional ordinary low-carbon steel or another suitable material. The consequences are savings in terms of weight and cost.

BRIEF DESCRIPTION OF THE DRAWINGS

Embodiments of the invention are illustrated in the drawing in which:

FIG. 12 is a view in cross-section through two connector track link members with mountings for track pivot pins and two screw-less connecting elements, FIG. 13 is a view in cross-section through two connector track link members with mountings for track pivot pins and connecting elements, FIGS. 14 to 16 show different configurations of outwardly disposed connecting elements, and FIG. 17 is a partly sectional view of a further pin mounting of a hinge track.

DETAILED DESCRIPTION OF PREFERRED EMBODIMENT

Figure 1:
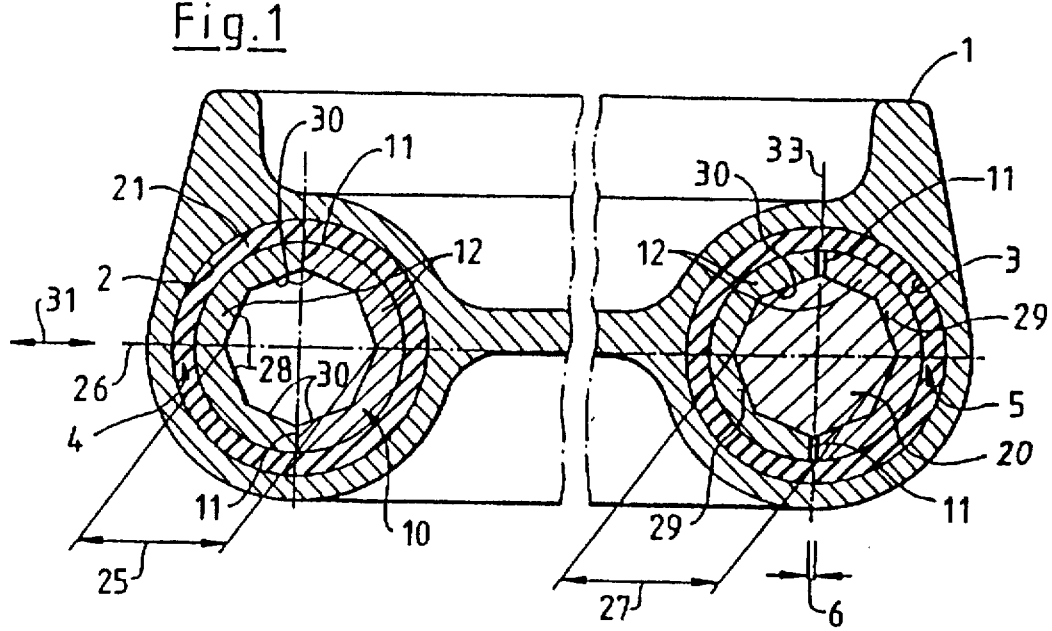
FIG. 1 is a view in cross-section of a track link member with mountings for track pivot pins.

In a track link member 1 of a caterpillar track, provided in bores 2, 3 are rubber mountings 4, 5.

A bush 10 of steel has two dividing gaps 11. At the outside periphery each bush half 12 involves a circular arc and at the inside, corresponding to an octagonal profile of a track pivot pin 20, it has a corresponding surface profile. Rubber rings 21 are fixedly connected by vulcanising to the bush halves 12.

When the bush 10 with the rubber rings 21 is pressed into the bore 2, the dividing gaps 11 are closed by virtue of the pressure of the braced rubber rings 21, see the left-hand bore 2 in FIG. 1. In that respect the internal width 25 in a main plane 26 of the track link member 1 is smaller than the corresponding diameter 27 of the track pivot pin 20. The length of the inside edges 28 corresponds to the lengths of the outside edges 29 of the track pivot pin 20. In comparison the inside edges 30 are reduced in length in accordance with the internal width 6 of about 0.5–1 mm (depending on the diameter of the track pivot pin 20) of the dividing gap 11.

The track pivot pin 20 has an oversize according to its diameter 27 in comparison with the internal width 25 of the bush 10. That oversize is also parallel and symmetrical relative thereto in the further pivot pin planes. By virtue of the track pivot pin 20 being inserted into the bush 10, the bush is driven apart in the direction indicated by the arrow 31. Accordingly the rubber mounting 5 is compressed more greatly than the rubber mounting 4, while the rubber mounting 5 is of uniformly high compression over its entire periphery.

The biasing force of the rubber mounting 5, which acts on the track pivot pin 20 after the track pivot pin has been inserted, braces the track pivot pin in the fit in the bush, as shown at the right in FIG. 1.

The bushes 40, 50, 60, 90 shown in FIGS. 2–5 are of the same wall thickness.

Figure 2:
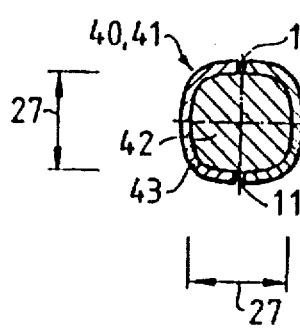
FIGS. 2 to 5 show different profiles of bushes and track pivot pins.

As shown in FIG. 2, a bush 40 is of a polygonal profile 41, with two dividing gaps 11. A track pivot pin 42 of a corresponding polygonal profile carries the two bush halves 43.

Figure 3:
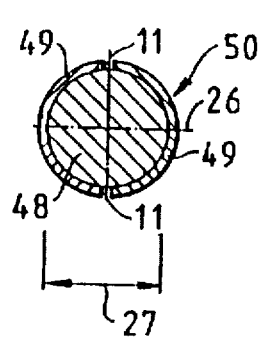

A round pin 48 is provided with two corresponding half-shells 49 of a bush 50 with the dividing gaps 11 as shown in FIG. 3.

Figure 4:
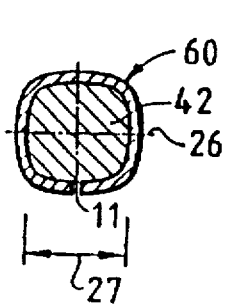

As a departure from FIG. 2, in FIG. 4 there is only a single dividing gap 11 on a bush 60.

Figure 5:
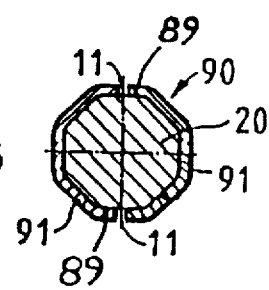

As illustrated in FIG. 5 the bush 90 comprises two half-shells 91 which are of an angular configuration. The dividing gaps 11 are in the middle of the surfaces 89 of the octagon.

Figure 6:
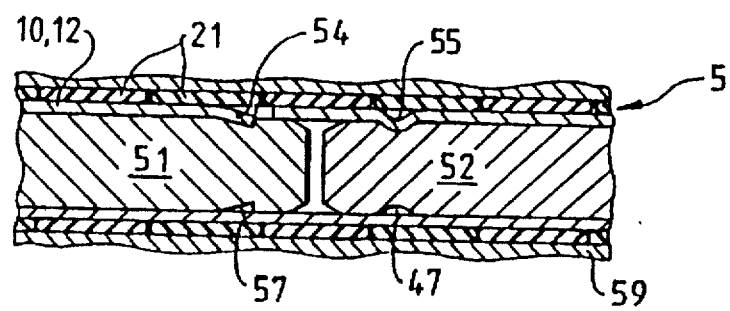
FIG. 6 is a view in section on line VI—VI in FIG. 7, showing two pin portions of track pivot pins in a bore in a track link member in longitudinal section.
Figure 7:
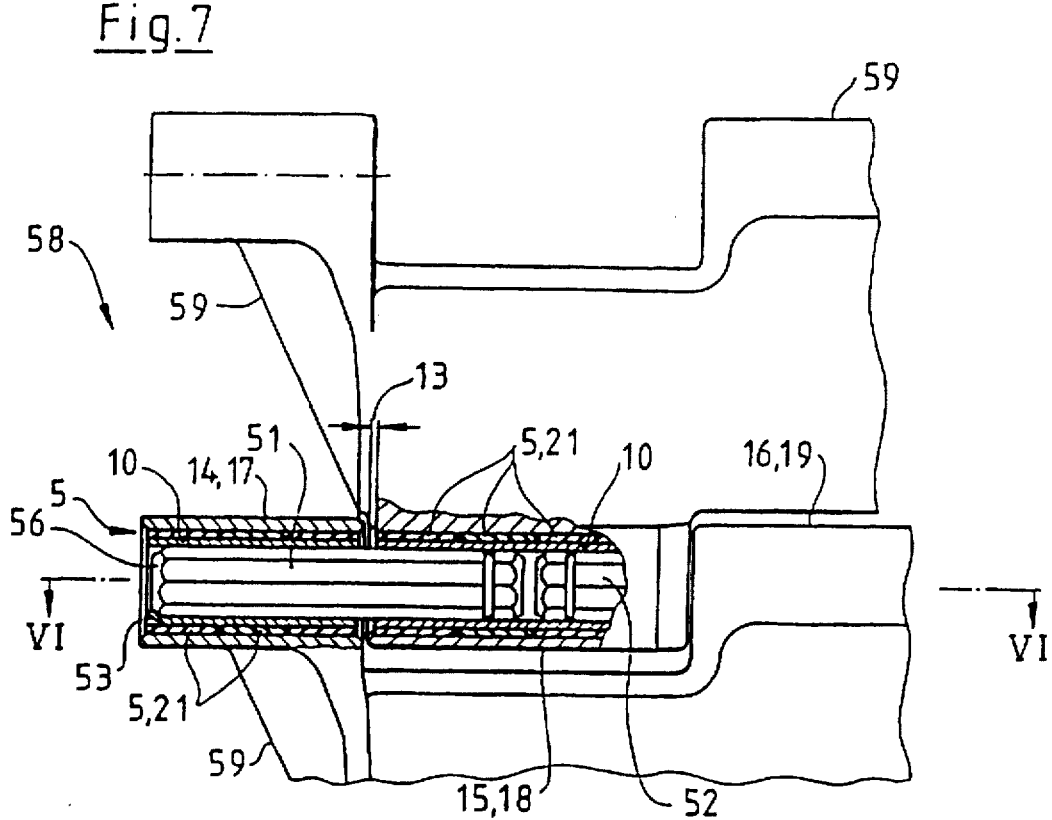
FIG. 7 shows a portion of a hinge track.

In the case of a hinge track 58 with hinge link members 59 as shown in FIG. 7, instead of a one-piece track pivot pin, a plurality of pin portions 51 are arranged in the rubber-lined bushes 10. The pin portions 51 are prevented from moving laterally out of the bushes 10, as shown in FIGS. 6 and 7, by each of the securing means 53 to 55. The securing means comprise tongues 53, 54 which are stamped out of the bush 10. The tongue 53 bears against the cone 56 on the pin portion 51. The tongue 54 engages into a sawtooth-shaped groove 57 in the pin portion 51. On the other hand the bead 55 fixes the pin portion 52 by positively locking engagement thereof into a suitable groove 47 in the pin portion 52.

After removal of the pin portions 51, 52, reliable separation of the track link members 59 is readily possible, even after the hinge track 58 has been in service for a prolonged period of time. For, the divided bushes 10 are shorter (spacing 13) than the width 14 to 16 of the hinges 17 to 19. Longitudinal displacements of the bushes 10, which occur due to possible consolidation or settlement of the rubber mounting 5, do not give rise to any impediment effect or locking action, upon dismantling of the hinge track 58.

Figure 8:
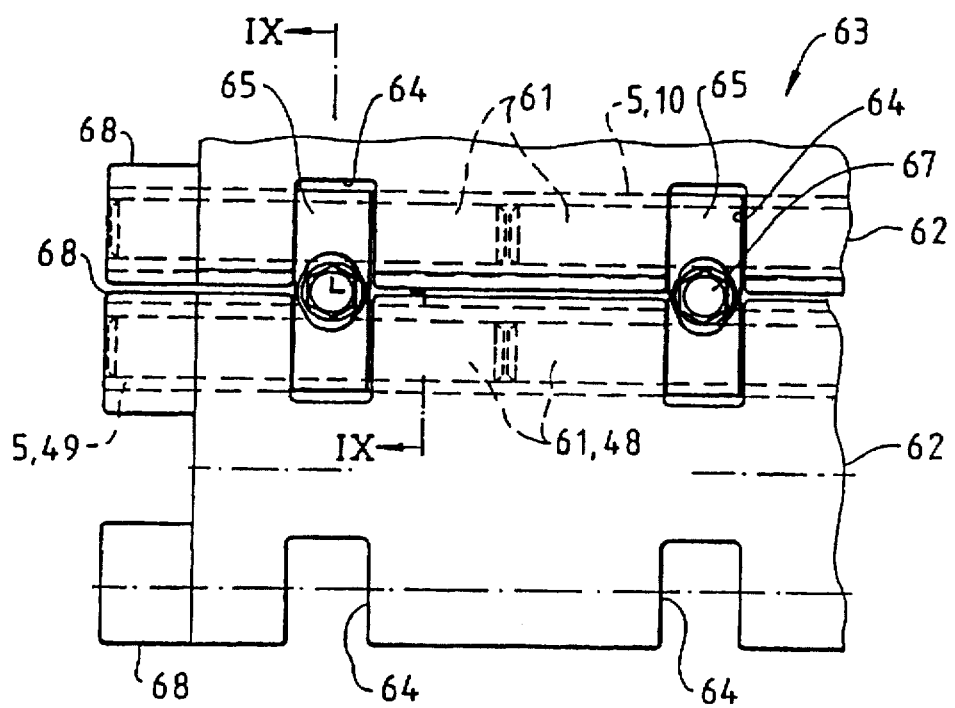
FIG. 8 shows a portion of a connector track.
Figure 9:
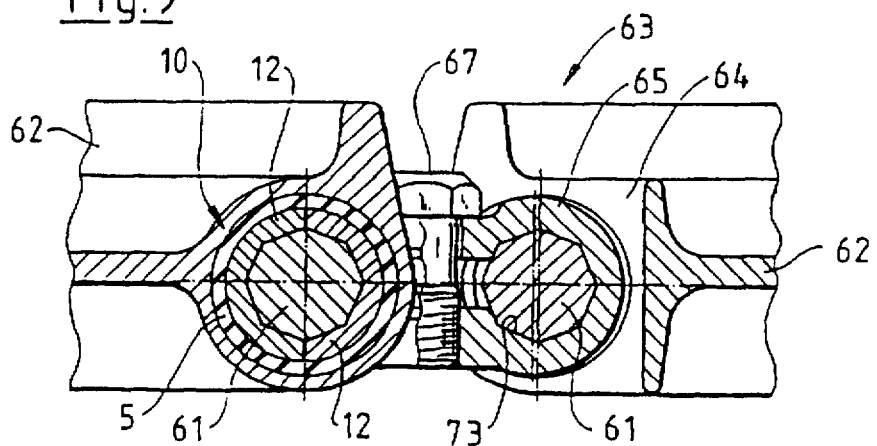
FIG. 9 is a view in section on line VIII—VIII through a connector as shown in FIG. 8.

As shown in FIGS. 8 and 9, pin portions 61 are pressed into the rubber-lined bushes 10 of steel, the latter being pressed into track link members 62 of a connector track 63 as shown in FIG. 1. The track link members 62 have openings 64 which are disposed in opposite relationship to each other, for one-part braced connectors 65. The screw connection is identified by 67. The connectors 65 have octagonal openings 73. They directly non-rotatably clamp the pin portions 61 by way of the screw connections 67. Mounting eyes 68 increase the mounting length of the pin portions 61.

Figure 10:
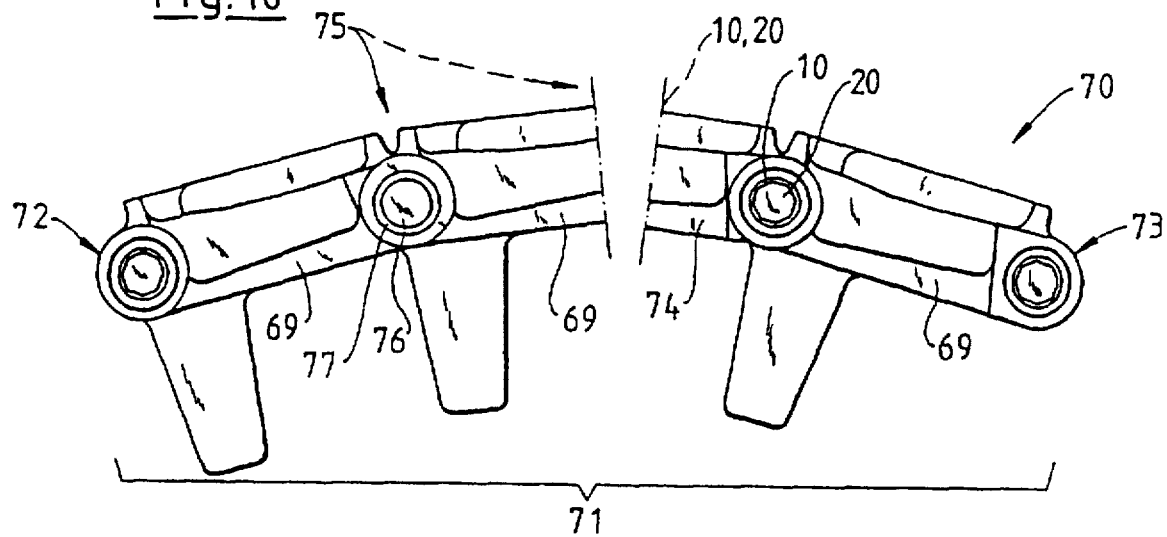
FIG. 10 is a segment of a hinge track.

As shown in FIG. 10 a plurality of track link members 69, 73 of a hinge track 70 are assembled to form a segment 71. A plurality of interconnected segments 71 form a track run (not shown) for a vehicle. For the purposes of connecting segments 71, closing locations 72, 73 are each provided with the divided bush 10 and the octagonal track pivot pin 20.

That provides for the correct position of assembly of two adjacent segments 71. The other hinge pivots 75 are provided with rubber-coated round pins 76. Rubber rings 77 are vulcanised on to round pins 76.

In order to afford the possibility, upon lengthening of the track, of being able simply to remove a track link member, a second track link member 74, behind the location 73, is provided twice with the track pivot pin 20 and with the divided bush 10.

On the other hand, in the case of a hinge track or a connector track, the entire track line can be equipped, by assembly in the works, with rubber-coated, preferably round pins 76 which are pressed into the bores 2 (FIG. 1). A complete track line is thus supplied form the factory.

Only the closing location is provided with a divided bush 10 and the track pivot pin 20 corresponding to the closing location 72 as shown in FIG. 9. The track pivot pin 20 is pressed in by means of an apparatus (not shown) and the track line is closed in that way.

The closing locations of a belt track may also be provided with the divided bush 10 and the track pivot pin 20.

Figure 11:
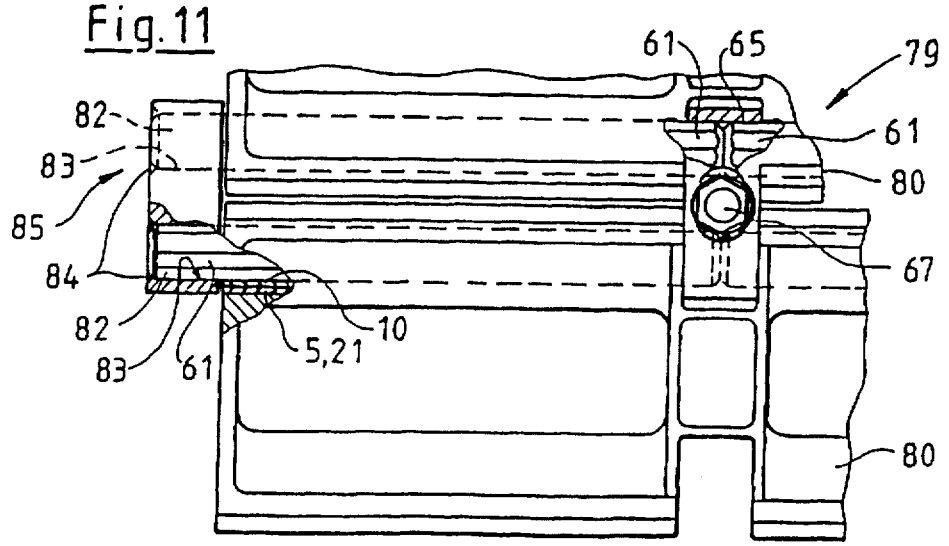
FIG. 11 shows a portion of a further connector track.

As shown in FIG. 11, in the case of a connector track 79, track link members 80 are connected together by screw-less connecting elements 85 and by the closed screwed central connector 65. Outwardly disposed connectors 81 are non-releasably connected to free ends 82 of the pin portions 61 by welded seams 84. The connectors 81 are provided with round or octagonal openings 83. Besides welding, brazing or pressing may also be used as further connecting methods.

As shown in FIG. 12 two track link members 92 of a connector track 93 are connected together by the screw-less connecting elements 85 shown in FIG. 11. The rubber-lined bushes 10 fix the octagonal pin portions 61.

A connector track 94 which in comparison can carry a higher loading and which is also wider, with track link members 96, as shown in FIG. 13, also has screw-less connecting elements 95 and the closed central connector 65 with screw connection 67. The octagonal pin portions 97, 98 are of different lengths as shown in FIGS. 13 and 16.

As shown in FIG. 15 a screw-less forked connecting element 99 comprises an octagonal bar material.

As shown in FIG. 17, a pin mounting 44 of chain link members 59 comprises bushes 9, 10 of different inside diameters 7, 8. Pin portions 45, 51 of the corresponding outside diameters are pressed into the bushes 9, 10. The inside diameter 7 of the outwardly disposed pressed-in bush 10 is above the inside diameter 8 of the inwardly disposed bush 9. That can provide a simplification in terms of assembly insofar as the thinner pin portion 45 is pushed with clearance through the outer bushes 10 and is then pressed into the inner bushes 9. Thereafter the thicker pin portion 51 is pressed into the bushes 10.

The principle of the divided bush can be applied in relation to connector tracks with three connectors on the track width or with two connectors on the track width. For special cases a single connector on the track width may also suffice.

In order better to carry the flexural moments, the pin portions 45, 51, 52, 61, 97, 98 may be joined by trunnion portions fitting one into the other, while on the other hand the pin portions 51, 52, 61 are prevented from moving laterally out of the track link members by positively locking trunnion interengagement.

We claim:

1. An endless hinged vehicular crawler drive track comprising:

a. a plurality of linked track link members, wherein each track link member defines a bore;

b. a prestressed rubber mounting concentrically mounted within the bore;

c. a bushing concentrically mounted within the prestressed rubber mounting, and having at least one dividing gap extending along a longitudinal direction of the bushing;

d. a track pivot pin concentrically mounted within the bushing, and wherein the internal width of the bushing is smaller than the diameter of the track pivot pin.

2. An endless hinged vehicular crawler drive track as claimed in claim 1, wherein the bushing is fixedly vulcanized to the rubber mounting.

3. An endless hinged vehicular crawler drive track as claimed in claim 1, wherein the internal width of the bushing, as measured in a main plane of the track link member, is smaller than the diameter of the track pivot pin.

4. An endless hinged vehicular crawler drive track as claimed in claim 1, wherein the bushing is of a one-piece construction.

5. An endless hinged vehicular crawler drive track as claimed in claim 1, wherein the bushing is of a multi-part construction.

6. An endless hinged vehicular crawler drive track as claimed in claim 1, wherein the periphery of the bushing has a circular configuration, and an internal contour of the bushing conforms with a cross-sectional shape of the track pivot pin.

7. An endless hinged vehicular crawler drive track as claimed in claim 1, wherein the periphery of the bushing has a polygonal configuration, and an internal contour of the bushing conforms with a cross-sectional shape of the track pivot pin.

8. An endless hinged vehicular crawler drive track as claimed in claim 1, wherein each track pivot pin comprises individual pin portions.

9. An endless hinged vehicular crawler drive track as claimed in claim 1, wherein each track pivot pin includes depressions which engage the bushing in a positively locking relationship.

10. An endless hinged vehicular crawler drive track as claimed in claim 1, wherein each dividing gap of the bushing is positioned in the track link member externally of a main plane of the track link member in which greatest forces are generated during operation of the drive track.

11. An endless hinged vehicular crawler drive track as claimed in claim 1, further including a one-piece inwardly disposed connector which clamps the track pivot pin secured against rotation.

12. An endless hinged vehicular crawler drive track as claimed in claim 1, further including externally disposed connecting elements having a one-piece and forked configuration.

13. An endless hinged vehicular crawler drive track as claimed in claim 8, wherein the diameters of the individual pin portions are of different sizes.

14. An endless hinged vehicular crawler drive track as claimed in claim 8, comprising a hinge track having the prestressed rubber mounting, bushing and track pivot pin positioned at a closing location on the hinge track.

15. An endless hinged vehicular crawler drive track as claimed in claim 8, comprising a connector track having the prestressed rubber mounting, bushing and track pivot pin positioned at a closing location on the connector track.

16. An endless hinged vehicular crawler drive track as claimed in claim 8, comprising a belt track having the prestressed rubber mounting, bushing and track pivot pin positioned at a closing location on the belt track.

\* \* \* \* \*